United States Patent
Bär et al.

(10) Patent No.: US 8,645,026 B2
(45) Date of Patent: Feb. 4, 2014

(54) METHOD FOR THE OPERATION OF A TRANSVERSE GUIDING DRIVER ASSIST SYSTEM OF A MOTOR VEHICLE, AND MOTOR VEHICLE

(75) Inventors: Michael Bär, Ingolstadt (DE); Karl-Heinz Meitinger, Munich (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/328,445

(22) Filed: Dec. 16, 2011

(65) Prior Publication Data

US 2012/0323446 A1 Dec. 20, 2012

(30) Foreign Application Priority Data

Dec. 18, 2010 (DE) .......................... 10 2010 055 136

(51) Int. Cl.
*B62D 6/00* (2006.01)

(52) U.S. Cl.
USPC ............................................................ 701/42

(58) Field of Classification Search
USPC ................................. 701/41, 70, 82; 382/104
See application file for complete search history.

(56) References Cited

U.S. PATENT DOCUMENTS

| | | | | |
|---|---|---|---|---|
| 5,359,666 A | * | 10/1994 | Nakayama et al. | 382/104 |
| 5,440,923 A | * | 8/1995 | Arnberg et al. | 73/146 |
| 5,661,650 A | * | 8/1997 | Sekine et al. | 701/82 |
| 5,934,407 A | * | 8/1999 | Shimizu et al. | 180/446 |
| 6,092,014 A | | 7/2000 | Okada | |
| 6,269,897 B1 | * | 8/2001 | Tamura et al. | 180/168 |
| 6,305,760 B1 | | 10/2001 | Otake | |
| 6,750,811 B2 | * | 6/2004 | Asanuma et al. | 342/174 |
| 6,807,287 B1 | * | 10/2004 | Hermans | 382/104 |
| 6,819,998 B2 | * | 11/2004 | Lin et al. | 701/70 |
| 7,184,073 B2 | * | 2/2007 | Varadarajan et al. | 348/148 |
| 8,134,478 B2 | | 3/2012 | Denaro | |
| 8,195,363 B2 | * | 6/2012 | Isaji et al. | 701/41 |
| 2008/0109135 A1 | * | 5/2008 | Lemmen et al. | 701/41 |
| 2011/0144865 A1 | | 6/2011 | Niemz | |

FOREIGN PATENT DOCUMENTS

| | | |
|---|---|---|
| DE | 197 30 336 | 1/1998 |
| DE | 196 49 137 | 8/2006 |
| DE | 102008002699 | 12/2009 |
| EP | 1 013 523 A2 | 6/2000 |
| EP | 2 159 777 A2 | 3/2010 |
| JP | 2005247158 | 9/2005 |

* cited by examiner

*Primary Examiner* — Mary Cheung
*Assistant Examiner* — Anne Mazzara
(74) *Attorney, Agent, or Firm* — Henry M Feiereisen LLC

(57) ABSTRACT

In a method for the operation of a transverse guiding driver assist system of a motor vehicle, a road banking information is ascertained as a function of a deviation of a transverse course of a road surface from a horizontal. A future road course is determined from environmental data and/or operating data of a motor vehicle, using the road banking information. A lateral track deviation is determined as a result of a change of a road banking, using the road banking information. At least one transverse guiding parameter is established from the future road course and the road banking information to determine a steering intervention. The lateral track deviation is then corrected by using the transverse guiding parameter.

14 Claims, 2 Drawing Sheets

METHOD FOR THE OPERATION OF A TRANSVERSE GUIDING DRIVER ASSIST SYSTEM OF A MOTOR VEHICLE, AND MOTOR VEHICLE

CROSS-REFERENCES TO RELATED APPLICATIONS

This application claims the priority of German Patent Application, Serial No. 10 2010 055 136.8, filed Dec. 18, 2010, pursuant to 35 U.S.C. 119(a)-(d), the content of which is incorporated herein by reference in its entirety as if fully set forth herein.

BACKGROUND OF THE INVENTION

The present invention relates to a method for the operation of a transverse guiding driver assist system of a motor vehicle.

The following discussion of related art is provided to assist the reader in understanding the advantages of the invention, and is not to be construed as an admission that this related art is prior art to this invention.

Tracking systems are known as driver assist systems for the transverse guidance of a motor vehicle to automatically carry out steering interventions. The tracking systems are constructed to enable a motor vehicle, for example on a highway, to automatically track the road course so long as no excessive steering interventions are required. Generally, these types of transverse guiding driver assist systems analyze a future road course, which is determined from environmental or operating data of the motor vehicle. Additional information, for example a street category or the like, can be assigned to this road course.

Constructions are known in which the future road course is determined by a navigation system of the motor vehicle and provided to a control device of the driver assist system, which then deduces the transverse guiding parameters, in particular a steering angle, therefrom. Such a future road course, which is provided by a navigation system, can for example be provided as form elements, which often are referred to as clothoids. These have attributes assigned to them which provide the future road course, concretely the course of the road which is being driven on. The attributes include for example the horizontal curvature in driving direction, the street category, the road surface and the like. Beside the transverse guiding driver assist systems, these data can also be used as environmental data in other vehicle systems.

It is customary to build roads such that they are not perpendicular to the gravity vector transverse to the driving direction, i.e. not absolutely horizontal, for example to allow drainage of rain water. The deviation of the transverse course of the road surface from the horizontal is usually referred to as "road banking". Roads are often configured such that in curves the incline is directed towards the inside of the curve, whereas in a straight course of the road, the roads or lanes slant towards the right to allow liquid to run off. Accordingly, a change in road banking can occur before a turn, when for example in the case of a road surface which slants towards the right, a left turn soon follows which is inclined towards the inside of the curve.

These changes in road banking mostly occur along relatively short regions of change, for example within a distance of 50 m, to keep the region in which the road is completely or approximately horizontal, as small as possible. Because this change in road banking is not known to a transverse guiding driver assist system, a substantial lateral path deviation sometimes occurs in the case of a change in road banking, for example before a turn. This course deviation is reflected in the environmental and/or operating data of the motor vehicle, which are also used for determining the steering intervention. However, because of the inertia of the control, which is mainly necessary because of comfort criteria, strong deviations accumulate, which can no longer be compensated with the maximal steering torques described by the system boundaries. As a result, the driver assist system is deactivated (termination of the operation) and a manual intervention becomes necessary. The limits of the permissible steering torques are governed for example by legal regulations, providing for a steering torque limit of for example 3 Nm, which are usually not sufficient when a change in road banking is involved.

It would therefore be desirable and advantageous to provide an improved transverse guiding driver assist system to obviate prior art shortcomings and realize a reliable functioning of the assist function even when the road banking changes.

SUMMARY OF THE INVENTION

According to one aspect of the present invention, a method for the operation of a transverse guiding driver assist system of a motor vehicle includes ascertaining a road banking information as a function of a change in a deviation of a transverse course of a road surface from a horizontal, determining a future road course from environmental data and/or operating data of a motor vehicle, using the road banking information, determining a lateral track deviation as a result of a change of a road banking, using the road banking information, establishing at least one transverse guiding parameter from the future road course and the road banking information to determine a steering intervention, and correcting the lateral track deviation by using the transverse guiding parameter.

It is proposed, to provide information with regard to the road banking change to allow a steering torque pilot control in the autonomous or partly autonomous driving of a vehicle. Through the road banking information which is assigned to the future road course, it is known beforehand which effects to expect, such that these can be compensated by a pilot control, and no excessive deviation, which exceeds the system boundaries during steering, has to be compensated.

In this way, the availability of the function provided by the driver assist system, for example a lane departure assistant, increases without compromising the comfort of regulation. Also, in cases in which an occurring lateral deviation might still have been corrected within the system boundaries by a stronger intervention, the acceptance of the transverse guiding driver assist system is increased by the method according to the invention since such strong steering interventions are no longer necessary and instead the correction can be "distributed" so to speak.

All this is possible through the road banking information which is assigned to the future road course.

In principle it is possible to determine the road banking information from the sensor data of at least one sensor, in particular a stereo camera and/or a distance sensor. This requires a sensor which can detect distances, such that a road banking switch or other change of the road banking can be deduced from the change of distances. Suitable distance sensors are for example laser sensors.

Since in most cases however, such a measurement has most likely inherent measurement errors, and additional sensors might be needed, it is preferred according to the invention, that the road banking information is determined from the data of a navigation system in which a change and/or course of a road banking is assigned to each road section. It is thus proposed, that the navigation system of the motor vehicle provides the road banking, by expanding the underlying map database of the navigation system with the parameter of the road banking and its changes. In most database structures this can be easily achieved, since only one additional attribute has to be added to the corresponding road section, which describes the course of the road banking and/or the change of the road banking over this road section.

In a further embodiment of the present invention, a lateral track deviation which results from the change of the road banking, can be determined by taking the road banking information into account, and corrected by adjusting the transverse guiding parameter. Since now, in addition to the future road course the course of the road banking or at least the integral change over a road section, is known, the resulting lateral track deviation for the future road course or road section, respectively, can be calculated beforehand. From this, the transverse guiding parameter or the course of the transverse guiding parameter, respectively, can now be determined, such that this lateral track deviation is corrected within the system boundaries of the driver assist system.

Here, essentially two approaches are conceivable. On the one hand, for a region of change of a road section, in which the road banking changes and in which the road course change is known, the lateral track deviation can be corrected in real-time based on the road banking information. This means it is corrected in such a way that the lateral track deviation does not occur in the first place, when driving on the future road section. This is a type of regulation which always demands small adjustments of the transverse guiding parameter, for example a set steering angle, in real-time.

On the other hand, however, it is also conceivable, to determine an integral lateral track deviation for a region of change of a road section, from the road banking information, and then correct the lateral deviation over this region of change. In this embodiment, the main goal is to correct the lateral track deviation which would occur if the road banking information was not taken into account, over a certain period of time, wherein it is conceivable for example to already create a lateral track deviation in the opposite direction before the actual change of the road banking, which is then adjusted again and the like. Of course it is also possible to allow a certain lateral track deviation to occur, which is then subsequently corrected again. All this can already be taken into account at the outset, since the road banking information is known beforehand, and can be integrated into the design of the steering interventions.

As already described, a current set steering angle can be used as transverse guiding parameter. However, other possibly additional, transverse guiding parameters are conceivable, which ultimately describe a steering intervention carried out by the driver assist system based on the transverse guiding parameters. An example are corresponding vehicle systems, in particular the steering itself. Another conceivable transverse guiding parameter is for example a set steering torque.

Further, the future road course can be determined in a, or the navigation system and provided to the driver assist system, in particular via a vehicle bus. The driver assist system or a control device of the driver assist system respectively, can be connected to the navigation system or its control device, respectively via a vehicle bus, for example a CAN-Bus, to receive predictive road data i.e. the future road course. Here, on the one hand, the navigation system can take sensor data into account, for example data of a GPS-sensor, an odometry-sensor and/or an inertia-sensor, to determine the current position of the motor vehicle, and on the other hand, to match these data to map data which have been retrieved from the map database (map-matching). From an integration of all these data the future road course, which is also often referred to as predictive road data, is then created and provided to the driver assist system via an interface. The driver assist system calculates the transverse guiding parameters from the future road course in advance, every time it receives a current future road course. The interface between the control device of the driver assistance system and the navigation system can be a CAN-bus, as described.

Beside the method, the invention also relates to a motor vehicle, comprising a transverse guiding driver assist system, which is configured to carry out the method according to the invention. All embodiments with regard to the method according to the invention can analogously be transferred to the motor vehicle according to the invention, resulting in the same advantages as described before. In particular, the motor vehicle can further comprise a navigation system which provides the future road course and in whose database the road banking information can be stored in addition to the already known map data. For communication between the navigation system and a control device of the transverse guiding driver assist system the motor vehicle can further comprise a CAN-bus. The method according to the invention is then carried out partly by the navigation system through the determination and provision of the future road course, and partly by the control element of the driver assistance system, in particular with regard to the determination of the transverse guiding parameter, wherein of course other embodiments are also conceivable.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
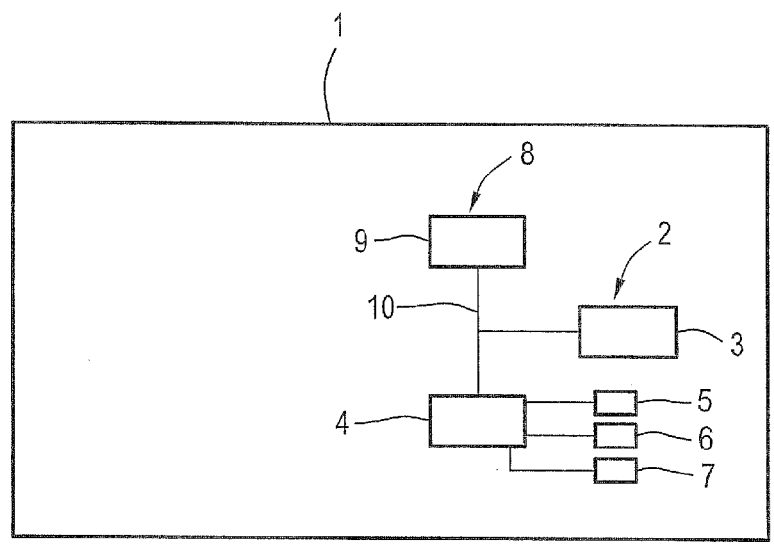
FIG. 1 is a schematic block diagram, depicting a transverse guiding driver assist system of a motor vehicle in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic block diagram, depicting a transverse guiding driver assist system 2 of a motor vehicle 1 in accordance with the present invention. The driver assist system 2 is configured for a semi-automatic or automatic transverse guidance of the motor vehicle 1 i.e. a transverse guiding driver assist system, to which a control device 3 is assigned.

Further, the motor vehicle 1 comprises a navigation system 4, which is configured for interpreting of the data of different sensors, wherein here, a GPS-sensor 5, an odometry-sensor 6 and an inertia-sensor 7 are shown. Further, FIG. 1 shows a control element 9 which is assigned to the steering system 8 of the motor vehicle 1.

Different components of the motor vehicle 1 communicate via a CAN-bus 10, in particular the control devices 3 and 9 as well as the navigation system 4. The driver assist system 2 is configured to carry out the method according to the invention, this means a future road course (predictive road data) is determined with the aid of the navigation system 4, to which road banking information is assigned. Using this future road course and the road banking information, the control element 3 determines adjusted transverse guiding parameters, which adjust a lateral track deviation of the motor vehicle 1 caused by a change of the road banking, while always operating within the system boundaries of the driver assist system, and making the drive as comfortable as possible for the driver. The transverse guiding parameters are transmitted to the control device 9 such that the corresponding steering intervention can actually be carried out. Transverse guiding parameters, which can be calculated in advance by the driver assist system 2, are for example a set steering angle (-course) and/or a steering torque(s) course.

Figure 2:
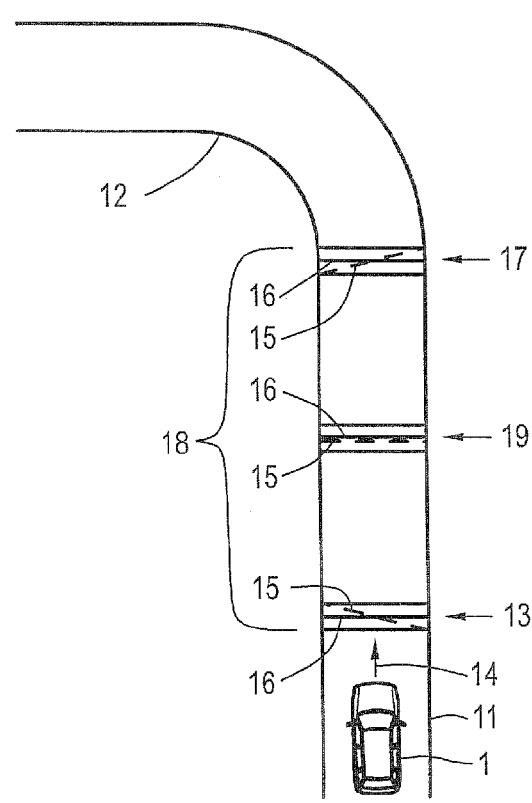
FIG. 2 is a schematic representation of a course of a road banking.

Based on a schematic diagram, FIG. 2 shows a typical course of a road banking in a region of change. Shown is a future road course 11 in front of the motor vehicle 1 according to the invention. As can be seen, the road enters a left turn 12 after a certain distance. Looking at the course of the road surface 15 transverse to the driving direction 14 of the motor vehicle 1 at position 13, reveals the presence of a road banking, since the transverse course 15 is slanted relative to the horizontal 16. In this case an incline to the right exists, which is used frequently. In contrast, the road banking in curves form an incline towards the inside of the curve. Accordingly, it can be seen at position 17, that the transverse course 15 immediately before the left turn 12 is slanted in opposite direction to the transverse course 15 at position 13. For that, the road banking is continuously changed, such that for example at position 19 the transverse course 15 lies entirely in the horizontal 16.

If the motor vehicle 1 drives through the region 18, without taking this change of the road banking into account, a lateral track deviation occurs, which should not have occurred based on the advance calculation, since the information regarding the road banking is not known. In this instance, large steering torques are required for a correction, which is not only detrimental to the comfort, but can also exceed the system boundaries of the driver assist system 2.

Figure 3:
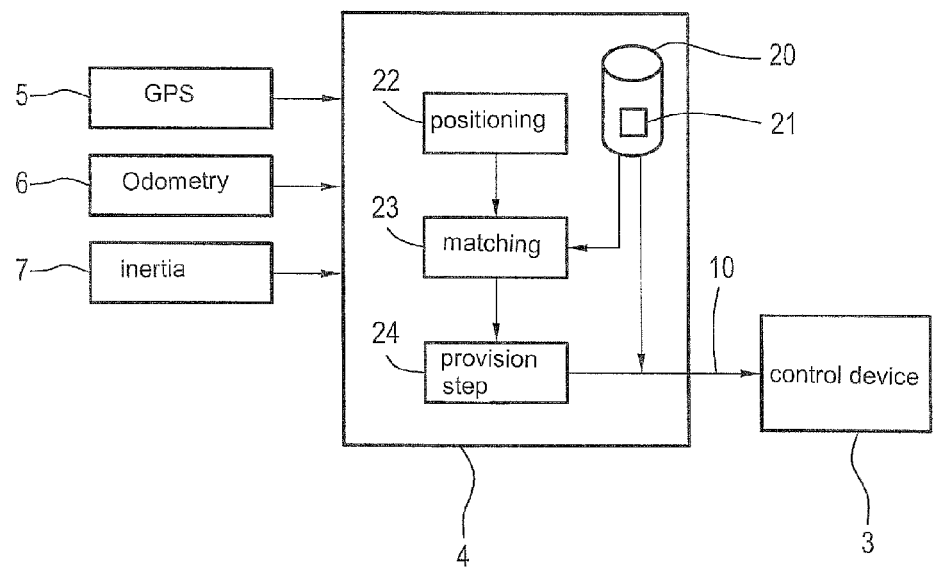
FIG. 3 is a schematic block diagram, depicting a sequence of the method according to the invention.
Figure 4:
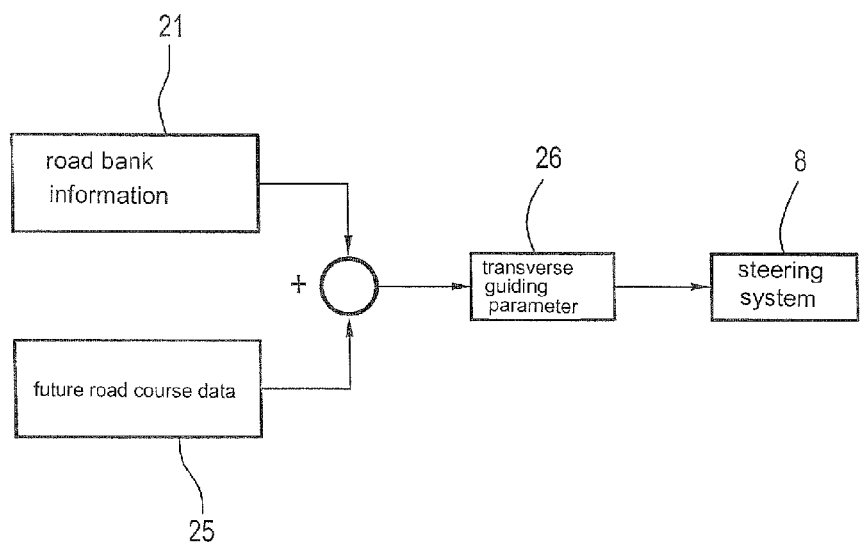
FIG. 4 is a schematic block diagram, illustrating further information integration steps of the method according to the invention.

In the driver assist system 2 of the motor vehicle 1, however, a road banking information is taken into account in the operation of the driver assist system 2, wherein the basic functionality is explained in more detail through the FIGS. 3 and 4.

In a map database 20 the navigation system 4 contains, beside the common map data, road banking information 21 which is assigned to the map data in a locally precise manner. These can be given in the form of an accurate course along a road section, however, the integral change over the road section can also be stored.

As can be seen, the navigation system 4 receives sensor data of the GPS-sensor 5, the odometry-sensor 6 and the inertia sensor 7. These sensor data are taken into account for the positioning 22 of the motor vehicle 1, after which a matching 23 to the map occurs by means of the map data, so called map-matching. Ultimately, this determines on which of the roads, concretely in which road section (clothoid) stored in the map data base, the motor vehicle 1 is located. Once the position of the motor vehicle 1 is determined with regard to the map data, a future road course can be provided in a provision step 24, wherein the corresponding road banking information 21 is now assigned to and provided along with this future road course. The future road course, also referred to as predictive road data, is transmitted via the CAN-bus 10 to other control devices or systems, respectively, and thus also to the control device 3 of the driver assistance system 2.

As shown in FIG. 4. this in turn uses not only the data 25 regarding the future road course provided thus far, but also the road banking information 21, to determine the transverse guiding parameters 26 which are then used to control the steering system 8 for a corresponding steering intervention.

In this regard two variants are introduced, how the driver assistance system 2, concretely the control device 3, adjusts the transverse guiding parameters by taking into account the road banking information 21. Thus, on the one hand, along a road section it can be observed continuously so to speak, if necessary in small steps, what lateral deviation would result by not taking the road banking information into account. This is then immediately corrected by a corresponding adjustment of the transverse guiding parameter, for example a set steering angle.

In another embodiment a road section is observed over its entire length, which means, an integral lateral track deviation is determined, which would occur by not taking the road bank information into account, which is then corrected, preferably by correction measures within this road section. It is then also possible, if applicable, to allow local lateral track deviations that are caused by the road banking, if they are correctly adjusted either before of afterwards.

Altogether thus, by taking the road banking information into account, the invention allows a comfortable driving which remains within the system boundaries of the driver assist system 2 without disturbances through changes of the road banking.

In addition, it is mentioned here, that the road banking information can in principle be determined from the sensor data of at least one sensor, for example a stereo camera and/or a distance sensor, in particular a laser sensor. However, it is preferred to expand the map data of a navigation system accordingly.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for the operation of a transverse guiding driver assist system of a motor vehicle, comprising:

ascertaining a road banking information with at least one sensor as a function of a change in a deviation of a transverse extent of a road surface from a horizontal;

determining with a navigation system a future road course from environmental data and/or operating data of a motor vehicle, using the road banking information;

determining with a control device a lateral track deviation as a result of a change of a road banking, using the road banking information;

establishing with the control device at least one transverse guiding parameter using the future road course and the road banking information, to determine a steering intervention; and correcting with the driver assist system the lateral track deviation by using the transverse guiding parameter.

2. The method of claim 1, wherein the sensor is a member selected from the group consisting of a stereo camera and a distance sensor.

3. The method of claim 1, wherein the road banking information is determined from data of the navigation system.

4. The method of claim 3, further comprising assigning a change and/or course of the road banking to each road section in the navigation system.

5. The method of claim 1, wherein the road banking information includes the deviation of the transverse course of the road surface from the horizontal.

6. The method of claim 1, wherein for a region of change of a road section, in which a road banking changes, and in which a course of the road banking is known, said road banking is corrected in real-time using the road banking information.

7. The method of claim 1, wherein for a region of change of a road section an integral lateral track deviation is determined from the road banking information and corrected over this region of change.

8. The method of claim 1, wherein a nominal steering angle is used as transverse guiding parameter.

9. The method of claim 1, wherein the future road course is determined in the navigation system and provided to the transverse guiding driver assist system.

10. The method of claim 9, wherein the future road course is provided to the transverse guiding driver assist system via a vehicle bus.

11. A motor vehicle, comprising a transverse guiding driver assist system, said transverse guiding driver assist system, said driver assist system comprising:

at least one sensor to ascertain a road banking information as a function of a change in a deviation of a transverse extent of a road surface from a horizontal, a navigation system to determine a future road course from environmental data and/or operating data of a motor vehicle, using the road banking information, and a control device to determine a lateral track deviation as a result of a change of a road banking, using the road banking information, and to establish at least one transverse guiding parameter using the future road course and the road banking information wherein the driver assist system is constructed to correct the lateral track deviation as a function of the transverse guiding parameter.

12. The motor vehicle of claim 11, wherein the sensor is a member selected from the group consisting of a stereo camera and a distance sensor.

13. The motor vehicle of claim 11, further comprising a navigation system in which a change and/or course of a road banking is assigned to each road section.

14. The motor vehicle of claim 11, wherein the transverse guiding parameter is a nominal steering angle.

* * * * *